Sept. 23, 1969  D. J. ARNOLD ET AL  3,468,580
COMBINATION DOOR AND STEP FOR VEHICLE BODIES
Filed April 21, 1967  3 Sheets-Sheet 1

INVENTORS
DELEVAN J. ARNOLD
THOMAS H. WHITNEY
BY Farley, Forster & Farley
ATTORNEYS

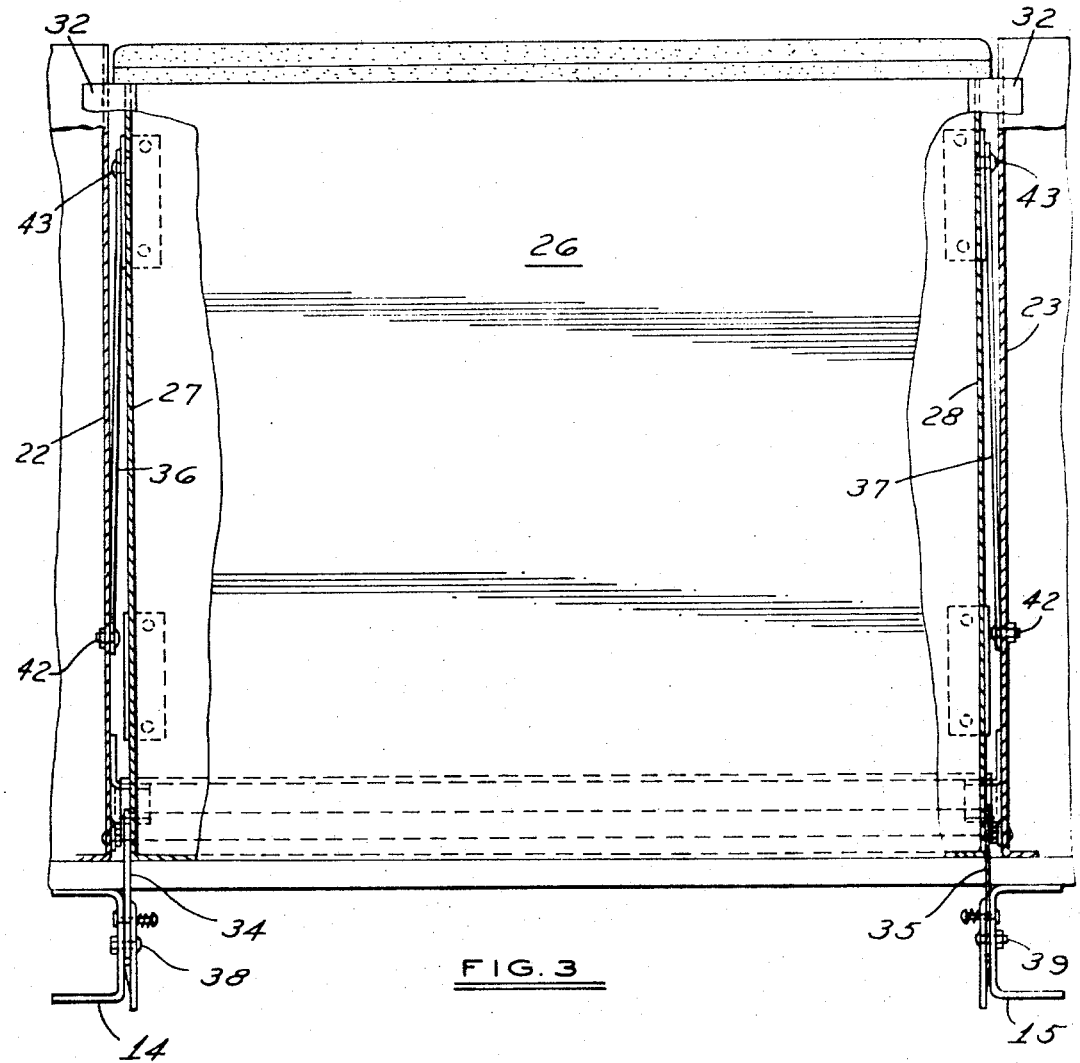

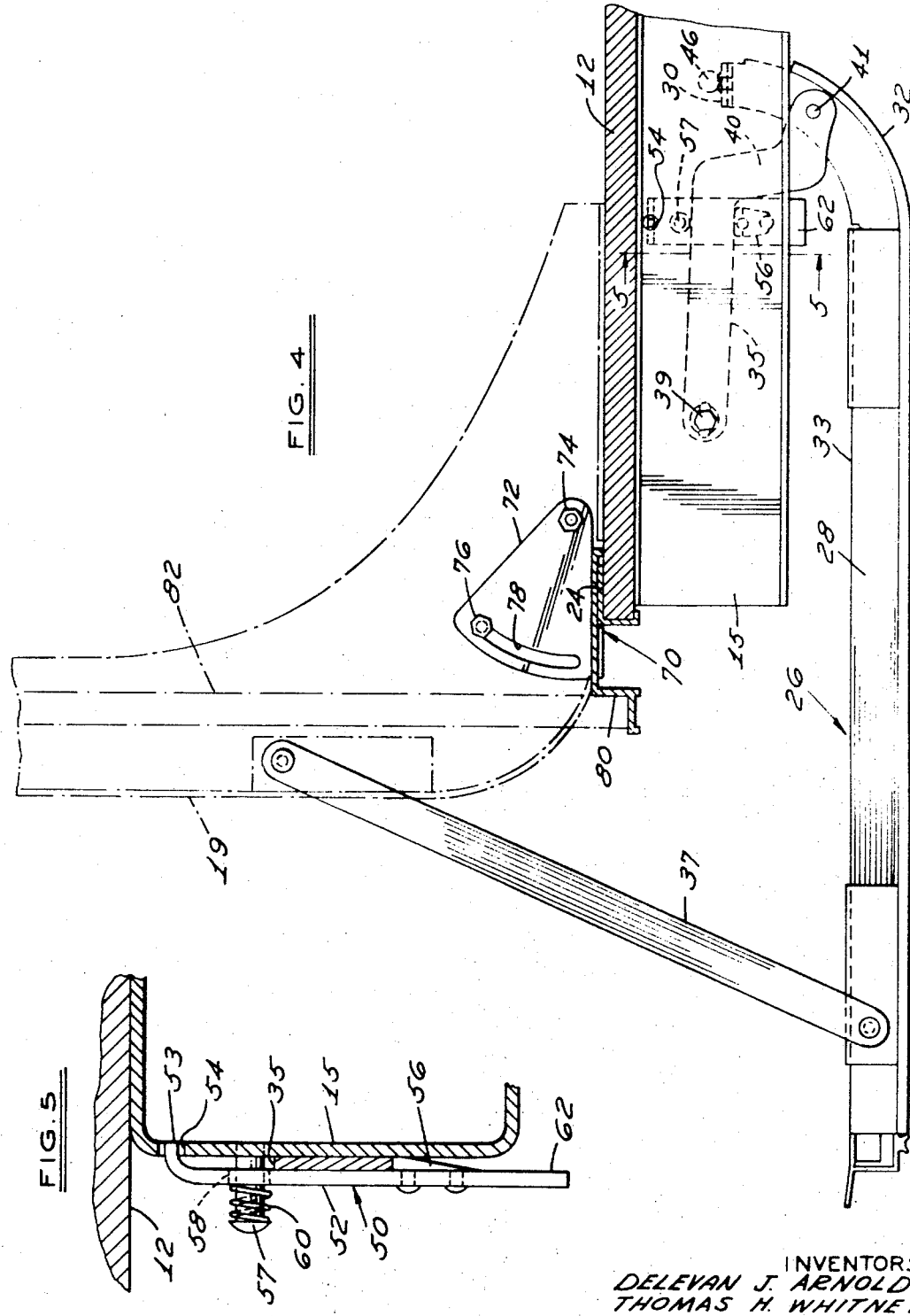

United States Patent Office 3,468,580
Patented Sept. 23, 1969

3,468,580
COMBINATION DOOR AND STEP FOR VEHICLE BODIES
Delevan J. Arnold, Columbiaville, and Thomas H. Whitney, Attica, Mich., assignors to Veseley Company, a corporation of Michigan
Filed Apr. 21, 1967, Ser. No. 632,709
Int. Cl. B60j 5/04, 9/00
U.S. Cl. 296—146                                    9 Claims

ABSTRACT OF THE DISCLOSURE

A door construction for the body of a vehicle such as a camping trailer having a floor, a side panel, and structure defining an opening therein in which the door is mounted. A hinge linkage connects the door to the body structure for opening movement in an outward, downward and inward direction to a step position in which the door sides are substantially parallel to and below the vehicle floor and the lower or bottom edge of the door is located below the floor and inwardly of the body side panel.

BACKGROUND OF THE INVENTION

Field of the invention

This invention relates to a door construction for the body of a vehicle such as a camp trailer, which enables the door to be employed as a step when in open position.

Background of the invention

A conventional camp trailer has a body structure which includes a floor and relatively low side panels on which a demountable super-structure can be erected to change the vehicle from highway to camping use. An access panel or door is usually provided in one of these side panels of the vehicle. In most camp trailers, the floor level is sixteen or more inches above ground level, and when in camping use the door only serves as a partial closure.

An object of the present invention is to increase the built-in features and utility of a camp trailer by providing a door forming part of the permanent side structure, which door is movable to a step position for camping use, thereby not only increasing the ease of entering and egress but also freeing the door opening for the use of another more satisfactory form of closure where desired.

SUMMARY OF THE INVENTION

According to the invention, a door construction for a vehicle body having a floor, a side panel and structure defining an opening therein in which the door is mounted, the door and opening having adjacent side and bottom edges, includes hinge means connecting the door to the body structure for opening movement in an outward, downward and inward direction to a step position in which the sides of the door are substantially parallel to and below the vehicle floor and the bottom edge of the door is located below the floor and inwardly of the side panel. A latch device retains the door in the step position.

Other features of the invention will appear from the following description of the representative embodiment thereof shown in the accompanying drawings:

BRIEF DESCRIPTION OF THE DRAWING

The drawing comprises the following views:

FIG. 3 is an enlarged side elevation, partly in section, showing the door and portions of the side panel adjacent thereto;

FIG. 4 is an enlarged sectional elevation similar to FIG. 2 showing the door in open or step position; and FIG. 5 is a sectional detail taken as indicated by the line 5—5 of FIG. 4 showing the latch device.

DESCRIPTION OF THE PREFERRED EMBODIMENT

Figure 1:
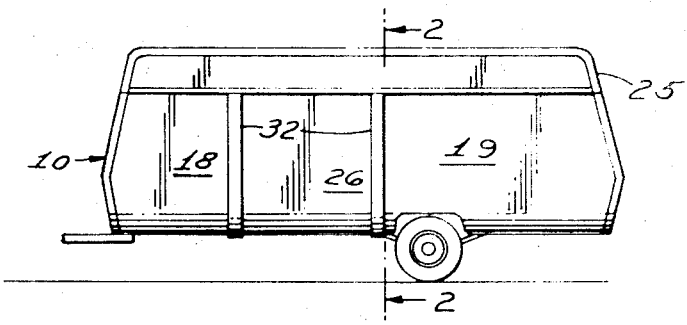
FIG. 1 is a side elevation of a representative camp trailer body in trailing or highway condition rather than camping condition, and having a door in the side thereof, constructed in accordance with the invention.
Figure 2:
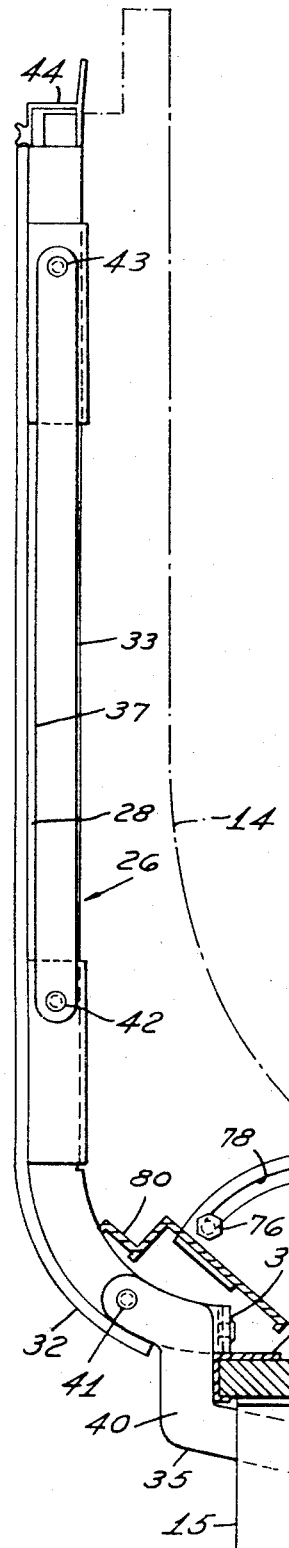
FIG. 2 is an enlarged sectional elevation taken as indicated by the line 2—2 of FIG. 1 showing one side edge of the door.

Referring to FIGS. 1–3, the body 10 of the camp trailer vehicle has a floor 12 mounted on a suitable frame which includes cross members 14 and 15, and a side panel separated into front and rear portions 18 and 19 by a door opening. The door opening is defined by structure including transverse members 22 and 23 at the ends of the side panel portions 18 and 19 and a sill 24 at the bottom of the opening, mounted on the floor 12. A top 25 is movable to convert the vehicle to camping condition.

A door 26, having side edges 27 and 28 and a bottom edge 30 is mounted in the opening, the door also having a sealing flange member 32 along each of its side edges.

Hinge means consisting of a pair of lower offset links 34 and 35 and a pair of upper links 36 and 37 connect the door 26 to the body structure, and as shown in FIGS. 2 and 4, this hinge means provides for opening movement of the door in an outward, downward and inward direction to a step position in which the upper surface 33 of the door is substantially parallel to and below the floor 12, and the bottom edge 30 of the door is located below the floor 12 and inwardly of the side panels 18 and 19. The lower links 34 and 35 are respectively connected to the frame cross members 14 and 15 by pivots 38 and 39. Each lower link includes an offset portion 40 and is pivotally connected at 41 to a side edge of the door adjacent the bottom thereof. The upper links 36 and 37 are respectively pivotally secured between the edges 22 and 23 of the door opening and the sides 27 and 28 of the door 26 by pivotal connections 42 and 43, the connections 43 of these links to the door being located adjacent the top 44 thereof.

The open or step position of the door 26, as shown in FIG. 4, is defined by stops or abutments 46 which are secured to the frame members 14 and 15 and are engaged by the bottom edge 30 of the door. These stops 46, together with the upper links 36 and 37 transmit to the body structure the reaction which takes place when weight is supported on the door in step position, the links 36 and 37 acting as struts in the step position of the door and extending angularly outwardly so that the application of any force to the door tends to produce inward movement thereof against the abutments 46.

One or more latch devices, best shown in FIGS. 4 and 5 are provided to retain the door 26 in step position. Only one such latch device 50 has been shown on the frame member 15, consisting of an arm 52 having a projection 53 at one end thereof engaging an aperture 54 in the frame member, and carrying a wedge-shaped latch member 56. A post 57, secured to the frame member 15, extends through a hole 58 in the arm 52, and a spring 60 mounted on the post 57 normally biases the arm toward the frame member. When the door 26 is swung to step position, the latch 56 is self-engaging with the underside of the lower link 35, preventing clockwise movement of the link as the parts are shown in FIG. 4 and retaining the bottom 30 of the door in juxtaposition with the fixed stop 46. The downwardly projecting end 62 of the arm 52 facilitates manual movement of the arm to release the latch from engagement with the link.

The door opening may be provided with an auxiliary door sill 70 carried between a pair of brackets 72 each of which is pivotally secured at 74 to the body panel structure at the sides of the door opening. When the door 26 is in step position as shown in FIG. 4, the auxiliary sill 70 may be pivoted to the horizontal position shown and locked therein by tightening a nut 76 mounted on a bolt fixed to the body structure and extending through an arcuate slot 78 in the brackets 72. The sill 70 is formed with an offset ledge 80 to act as a seal and stop for an auxiliary door 82 which may be mounted in the door opening when the door 26 is being employed as a step.

The door construction of the invention offers the convenience of a step when the trailer is being used as a camping dwelling, and the added convenience of changing the position of the door 26 so that an alternate more suitable door can be installed.

While a preferred embodiment has been described above in detail, it will be understood that numerous modifications might be resorted to without departing from the scope of the invention as defined in the following claims.

We claim:

1. In a vehicle body having a floor, a side panel and structure defining an opening therein with a bottom edge adjacent the floor and a pair of side edges, an improved door construction comprising a door member having side and bottom edges which in a closed position of the door member are adjacent the side and bottom edges of the opening, hinge means including at least one pair of links connecting the door member to the body structure for outward, downward and inward opening movement to a step position in which the sides of the door are substantially parallel to and below the vehicle floor and in which the bottom edge of the door is located below the floor and inwardly of the side panel; and latch means for retaining the door in step position.

2. A door construction as claimed in claim 1 wherein the one pair of links comprise a pair of off-set links each pivotally connected to the vehicle body beneath the floor and to the door member adjacent the bottom edge thereof.

3. A door construction as claimed in claim 1 wherein the one pair of links comprise a pair of links each pivotally connected to the body structure at one side of the door opening and to one adjacent side edge of the door member, and serving as a supporting strut for the door member in the step position thereof.

4. A door construction as claimed in claim 3 wherein the hinge means further includes a second pair of off-set links each pivotally connected to the vehicle body beneath the floor and to the door member adjacent the bottom edge thereof.

5. A door construction as claimed in claim 1 wherein at least one of the pair of links is engageable with the latch means.

6. A door construction as claimed in claim 1 wherein the hinge means comprises a pair of offset links each having one end pivotally secured to the vehicle body beneath the floor and inwardly of the side panel and having the other end pivotally secured to one side of the door adjacent the bottom edge thereof, and a second pair of links each pivotally secured to the body structure at one side of the door opening and to one side edge of the door at a location upwardly from the bottom edge thereof, the second pair of links acting as struts to support the upper portion of the door in step position, and abutment means on the vehicle body engageable by the door in step position.

7. A door construction as claimed in claim 6 wherein the latch means is engageable with at least one of said offset links to retain the door in step position.

8. A door construction as claimed in claim 1 further comprising a sill member, and hinge means connecting the sill member to the body structure at the sides of the door opening for movement of the sill member to an operative position parallel to the body floor when the door is in step position.

9. A door construction as claimed in claim 8 further comprising means for retaining the sill member in operative position.

References Cited

UNITED STATES PATENTS

| | | | |
|---|---|---|---|
| 2,415,341 | 2/1947 | Dean | 105—430 |
| 3,213,962 | 10/1965 | Clark | 49—40 X |

FOREIGN PATENTS 348,717  5/1931  Great Britain.

PHILIP GOODMAN, Primary Examiner

U.S. Cl. X.R.

49—40; 105—430